United States Patent [19]

Nezat

[11] Patent Number: 4,510,162
[45] Date of Patent: Apr. 9, 1985

[54] COMPOSITION FOR ABSORBING OXYGEN AND CARRIER THEREFORE

[75] Inventor: Jerry W. Nezat, Kalispell, Mont.

[73] Assignee: Creative Research & Development, Inc., Whitefish, Mont.

[21] Appl. No.: 473,097

[22] Filed: Mar. 7, 1983

[51] Int. Cl.³ .......................... C09K 15/00; A23L 3/00
[52] U.S. Cl. .............................. 426/124; 252/188.28; 426/106; 426/398; 426/418; 426/419; 426/62
[58] Field of Search ..................... 252/188.28; 436/21, 436/22, 24; 426/62, 124, 106, 316

[56] References Cited

U.S. PATENT DOCUMENTS 2,825,651  3/1958  Loo et al. .................... 252/188.28
4,166,807  9/1979  Komatsu et al. ............. 252/188.28
4,384,972  5/1983  Nakamura et al. ........... 252/188.28
4,406,813  9/1983  Fujishima et al. ............ 252/188.28

FOREIGN PATENT DOCUMENTS 4099092  8/1979  Japan ............................ 252/188.28
7188681  11/1982  Japan .................................. 252/388

Primary Examiner—Teddy S. Gron
Assistant Examiner—Virginia B. Caress
Attorney, Agent, or Firm—Thomas R. Vigil

[57] ABSTRACT

An oxygen absorbent composition mounted on a suitable carrier and adapted to be mounted in a closeable container for removing oxygen from the space within the container. The composition comprises iron particles and yeast, mixed together with some moisture.

19 Claims, No Drawings

COMPOSITION FOR ABSORBING OXYGEN AND CARRIER THEREFORE

BACKGROUND OF THE INVENTION

1. Field of the Invention

The present invention relates to a composition of materials which is fixed on a carrier, such as piece of cloth, and then affixed to the underside of a cover for a container. The composition serves to absorb oxygen from the air, water or any other substance in the container thereby to prevent oxidation of materials in the container or to de-oxidate materials in the container.

2. Description of the Prior Art

Heretofore an oxygen absorbent comprising metal slivers or powders in or on a carrier such as a piece of gauze or cotton which has been impregnated with a liquid medium such as water or a salt water solution has been proposed. Examples of such previously proposed oxygen absorbents are disclosed in the following U.S. Patents:

| U.S. PAT. NO. | PATENTEE |
| --- | --- |
| 4,192,773 | Yoshikawa et al. |
| 4,166,807 | Komatsu et al. |

Other examples are disclosed in the following Derwendt abstracts of Japanese patents:
76 JA 147452, 77 JA 066987, 77 JA 076294, 78 JA 030610, 79 JP 092568.

Japanese Patent Abstract 79 JP 092568 discloses the provision of oxygen absorbing material for use in food storage. The material comprises iron powder of approximately 100 mesh, sodium chloride and a packing agent mixed together to obtain an oxygen absorbing agent. Typically the packing agent will include water.

In Japanese Patent Abstract 77 JA 066987 there is disclosed a deoxygenating agent comprising iron carbide powder and a salt, e.g., sodium chloride, carried on a support or carrier such as cotton.

The two U.S. Pat. Nos. 4,166,807 and 4,192,773 each disclose an oxygen absorbent comprising a metal halide and iron.

As will be described in greater detail hereinafter, the oxygen absorbing composition of the present invention comprises iron particles and yeast and some water which are placed on a carrier such as a piece of cotton cloth or a cotton ball.

It has been found that the yeast acts as an organic electrolyte and yet does not form a salt on the iron particles in the composition. As a result, very small iron particles can be utilized increasing the surface area for oxidation thereby increasing the rate of oxidation.

SUMMARY OF THE INVENTION

According to the invention there is provided an oxygen absorbent composition mounted on a suitable carrier and adapted to be mounted in a closeable container for removing oxygen from the space within the container, said oxygen absorbent composition comprising iron particles and yeast, mixed together with some moisture.

DESCRIPTION OF THE PREFERRED EMBODIMENT

The oxygen absorbent composition of the present invention for removing oxygen from an enclosed container comprises powdered iron mixed with dry activated yeast and dampened with a small amount of water. Typically the ingredients of iron powder yeast and water are mixed together and then placed on a suitable carrier such as a piece of cotton cloth 3 or 4 inches square, which can be folded to one inch, a piece of cotton gauze, a cotton ball, or other suitable carrier.

In one embodiment, approximately 1 part powdered iron by volume was added to approximately $\frac{1}{8}$ part by volume dry activated yeast. Then, a suitable amount of water is added to the mixture to wet or dampen same. This was realized in one embodiment by adding one and one quarter teaspoons of water to the composition, mixing and placing the composition on a carrier comprising a piece of cotton cloth 3 inches by 4 inches. The piece of cloth is then folded over to a size of approximately 1 inch.

In another embodiment of the composition, 1/1000 pound of iron powder was mixed with 1/69,000 pound of dry activated yeast per quart of air space to be deoxygenated in a container containing foodstuffs for a one time oxygen removal.

In another embodiment of the composition a small amount of acetic acid in the form of vinegar was added to the water used for dampening or wetting the mixture. This was achieved by mixing $1\frac{1}{4}$ teaspoons of 1% vinegar/water solution with the yeast and iron.

In still another embodiment of the composition, a small amount of a mixture of ascorbic acid and sodium bisulfate was added to the mixture. In one specific experiment, 1 gallon of 1% by weight mixture of ascorbic acid and sodium bisulfate was added to the composition for each one hundred pounds of fresh fruit and vegetables placed in a closed container to maintain the "freshness" of the fruit and vegetables.

The range of ratios of yeast by volume to iron powder by volume which has been found to provide improved oxygen absorption is between 1:50 yeast to iron and 30:1 yeast to iron. One preferred ratio is 1:8 yeast powder to iron powder by volume with 200 mesh iron powder.

As for mesh size, 50 to 280 mesh iron powder can be used. Of course, it will be understood that the smaller the mesh size, the more surface area available for oxidation.

Empirical tests have shown that the compositions of the present invention including yeast in place of a salt provide much better oxygen absorption. In this respect, the time required to achieve deoxidation is reduced and the oxidation capability of the iron is enhanced.

In this respect, it has been found that the composition of the present invention including yeast may take out oxygen approximately 3 times faster than a composition utilizing salt water and iron powder. In one test, a given quantity by weight of wetted iron powder and sodium chloride for a given air space took 24 hours to deoxidize the space and the same quantity of wetted yeast and iron powder by weight took 16 hours to deoxidize the space, and the same quantity by weight of wetted yeast, iron powder and acetic acid took $5\frac{1}{2}$ hours to deoxidize the space.

The yeast acts as a binder to the cloth and iron, thus a filler is not needed and the composition on the cloth carrier can be adhered to the underside of a cap or cover for a jar, bottle, can or other container. It has also been found that the container can be opened and closed several (3 or 4) times without using up the oxygen absorbing capability of the oxygen absorbent composition of the present invention on the cloth carrier.

It is to be noted that salt forms a film on iron particles that block oxygen from reaching the iron particles and reduces the amount of oxidation by the iron particles.

Yeast does not form a film on the iron particles, powder or fillings and does not block oxidation. As a result, the oxygen absorbent composition of the present invention works much faster and requires a smaller amount of iron particles.

The oxygen aborbent composition is particularly adapted for being mounted on the underside of a cover for a container such as a cover for a jar, can or other container. Typically, the composition will be mounted on a suitable carrier such as a piece of cotton cloth, gauze or cotton ball. Also, it may be desirable to encase the carrier and composition within oxygen permeable plastic film such as polyethylene or polypropylene.

The composition on the carrier then will be utilized to absorb oxygen from the space within the container thereby to prevent oxidation of the contents of the container which can be fresh foodstuff, such as fresh fruit, vegetables, grain, etc., dried foodstuff, such as dried grains, raisins, prunes, etc., preserved foodstuff or prepared foodstuff, such as cereals, coffee, etc., and other substances, such as, for example, aspirin.

Also with respect to fresh fruits and vegetables, it has been found, as noted above, that it is desirable to add some acetic acid, e.g., vinegar, and some ascorbic acid and sodium bisulfate to the composition, which assist in deoxidation and also in clarifying the air within the container.

Further, it has been found that the composition has a very beneficial use in withdrawing oxygen from a container that also contains water. In this respect, it has been found that water that is deoxygenated is utilized better by living cells, whether they be plant cells or animal cells. Although it is not known with complete certainty exactly why it is beneficial, it is believed that the benefit may be that the water is more active because it is not coupled to oxygen atoms, i.e., the $H_2O$ molecules can connect to other atoms since they are not being taken up by oxygen atoms.

Deoxygenated water is sometimes referred to as superwater because of its ability to enhance growth of cells in plants and animals and it seems to be better for living cells than oxygenated water.

It is contemplated that in a method for using the composition of the present invention, the composition will be utilized to withdraw oxygen from water and then the deoxygenated water would be used for a number of different purposes.

Tests have also shown that the rate of oxidation of the composition can be enhanced by the use of microwave energy as a catalyst. In this respect, the enclosed "space" to be deoxygenated, e.g., in a container, can be deoxygenated more quickly by placing the enclosed "space" in a microwave oven where the microwave energy can heat the iron particles thereby to increase the oxidation capability thereof.

Moreover, the composition can be placed in a microwave oven where a substance is caused to flow through the microwave oven such as on a conveyor or, if a liquid, such as water, via a duct or trough. In this way, for example, a stream of flowing water can be deoxidized prior to its being used for irrigation of plants by placing an abundant quantity of the oxygen absorbent composition in a closed space above a flow through trough in the microwave oven.

From the foregoing description, it will be apparent that the oxygen absorbent composition of the present invention has a number of advantages, some of which have been described above and others of which are inherent in the invention. Most importantly, the composition of the invention is quicker in withdrawing oxygen from the space inside a container and can be reused a number of times, which provides advantages over presently available oxygen absorbent compositions.

Also, it will be apparent that modifications can be made to the composition of the present invention without departing from the teachings of the present invention. Accordingly, the scope of the invention is only to be limited as necessitated by the accompanying claims.

I claim:

1. An oxygen absorbing composition mounted on a carrier for carrying the composition and said carrier being capable of being placed in a closable container for removing oxygen from the space within the container, said oxygen absorbing composition comprising iron particles and yeast mixed together with moisture in an amount sufficient to dampen the composition.

2. The composition of claim 1 wherein said yeast is dry activated yeast.

3. The composition of claim 1 wherein the iron particles are comprised of iron powder having a mesh size between 50 and 250.

4. The composition of claim 3 wherein said iron powder has a mesh size of 200.

5. The composition of claim 3 wherein the ratio by volume of yeast to iron powder is from 1:50 to 30:1 yeast by volume to iron powder by volume.

6. The composition of claim 5 wherein the ratio by volume of yeast to iron powder is approximately 1:8.

7. The composition of claim 1 wherein the weight of iron powder to yeast for each quart of air space to be deoxygenated is approximately 1/1000 lb to 1/69,000 lb.

8. The composition of claim 7 wherein approximately 1 and ¼ teaspoons of water are added for each quart of air space to the composition to dampen same.

9. The composition of claim 1 wherein said carrier is a piece of cotton cloth.

10. The composition of claim 1 wherein said carrier is a piece of cotton.

11. The composition of claim 1 wherein said carrier and composition thereon are wrapped in an oxygen permeable film.

12. The composition of claim 1 wherein said carrier is affixed to the underside of a closure member for a container.

13. The composition of claim 1 including a small amount of acetic acid added thereto.

14. The composition of claim 1 including a small amount of ascorbic acid and sodium bisulfate.

15. The composition of claim 7 wherein 1¼ teaspoons of 1% vinegar/water solution are added for each quart of air space to said composition.

16. The composition of claim 15 being mounted in a closed container containing fresh fruits or vegetables and wherein said composition has added thereto 1 gallon of a mixture of ascorbic acid and sodium bisulfate mixed in a ratio of 1:1 by weight for each one hundred pounds of fruit or vegetables.

17. The composition of claim 1 being mounted in a container for a liquid, such as water, for removing oxygen therefrom to provide deoxygenated liquid.

18. The composition of claim 1 being mounted in a microwave oven which is capable of heating the iron particles to enhance and accelerate oxidation of the particles.

19. The composition of claim 1 being mounted under the cover for a container for foodstuffs comprising fresh grown foodstuffs, prepared foodstuffs, dried foodstuffs or moist or liquid foodstuffs for humans or other living creatures.

* * * * *